United States Patent
Oda et al.

(10) Patent No.: US 9,374,033 B2
(45) Date of Patent: Jun. 21, 2016

(54) THREE-LEVEL POWER CONVERSION APPARATUS

(71) Applicant: TOSHIBA MITSUBISHI-ELECTRIC INDUSTRIAL SYSTEMS CORPORATION, Chuo-ku, Tokyo (JP)

(72) Inventors: Kenji Oda, Tokyo (JP); Katsuhiko Fukuma, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 79 days.

(21) Appl. No.: 14/371,599

(22) PCT Filed: Dec. 25, 2012

(86) PCT No.: PCT/JP2012/083416
§ 371 (c)(1),
(2) Date: Jul. 10, 2014

(87) PCT Pub. No.: WO2013/105427
PCT Pub. Date: Jul. 18, 2013

(65) Prior Publication Data
US 2015/0002066 A1 Jan. 1, 2015

(30) Foreign Application Priority Data

Jan. 11, 2012 (JP) ................ P2012-002911

(51) Int. Cl.
*H02P 27/14* (2006.01)
*H02M 7/487* (2007.01)
*H02M 5/458* (2006.01)

(52) U.S. Cl.
CPC ............ *H02P 27/14* (2013.01); *H02M 5/4585* (2013.01); *H02M 7/487* (2013.01); *H02P 2201/01* (2013.01)

(58) Field of Classification Search
CPC .......... H02P 21/05; H02P 27/08; H02P 27/14
USPC ............ 318/400.26, 442, 478, 479, 500, 722
See application file for complete search history.

(56) References Cited

U.S. PATENT DOCUMENTS 5,321,599 A * 6/1994 Tanamachi ............ H02M 7/487
318/811
7,667,342 B2 * 2/2010 Matsumoto .............. B60K 6/26
290/40 C (Continued)

FOREIGN PATENT DOCUMENTS

| EP | 2 270 969 A1 | 1/2011 |
| JP | 62 250871 | 10/1987 |
| JP | 09-65658 | 3/1997 |

OTHER PUBLICATIONS

Communication Pursuant to Article 94(3) EPC in European Application No. 12 865 086.8, dated Apr. 29, 2016, 7 pages.

(Continued)

*Primary Examiner* — Bentsu Ro
(74) *Attorney, Agent, or Firm* — Finnegan, Henderson, Farabow, Garrett & Dunner, LLP

(57) ABSTRACT

A three-level power conversion apparatus can suppress fluctuation in a neutral point voltage even when operated as a reactive power regulator. The three-level power conversion apparatus is composed of first and second three-level converters connected to an AC power supply, positive side and negative side DC capacitors, a three-level inverter to drive an AC motor, and converter control unit for controlling the three-level converters. The converter control unit has first and second reactive current controllers for controlling so that reactive portions of input currents of each three-level converter become a prescribed reactive current reference, first and second neutral point voltage fluctuation suppressing units for controlling a PWM controller, to make a voltage difference of two DC capacitors zero, and an active current controller for supplying a prescribed circulating active current from one three-level converter to other three-level converter.

9 Claims, 4 Drawing Sheets

(56) References Cited

U.S. PATENT DOCUMENTS 8,929,111 B2 * 1/2015 White .................. H02M 7/487
363/123
2009/0244945 A1 10/2009 Hatanaka 2011/0134672 A1 6/2011 Sato et al.

OTHER PUBLICATIONS

Supplementary European Search Report in Application No. 12865086.8, dated Apr. 5, 2016, 4 pages.

* cited by examiner

THREE-LEVEL POWER CONVERSION APPARATUS

CROSS-REFERENCE TO RELATED APPLICATION

This application is based upon and claims the benefit of priority from the prior Japanese Patent Application No. 2012-002911, filed on Jan. 11, 2012; the entire contents of which are incorporated herein by reference.

TECHNICAL FIELD

This invention relates to a three-level power conversion apparatus which is provided with a three-level converter to obtain a three levels direct current from an AC power supply, and a three-level inverter to convert this direct current into an alternating current.

BACKGROUND ART

Conventionally, as a power conversion apparatus to drive a motor with a relatively large capacity, a three-level power conversion apparatus has been used which is provided with a three-level converter, and a three-level inverter to convert the direct current of this output into an alternating current. This three-level power conversion apparatus is configured to have three levels DC voltages composed of a positive electric potential, a negative electric potential, neutral point, and if a voltage (electric potential) of the neutral point fluctuates, the voltages of an AC power supply and the motor as a load of the power conversion apparatus also fluctuates, to cause unnecessary harmonics to be generated. For this reason, a proposal has been made, wherein positive side and negative side switching devices are provided which are respectively connected from a neutral point to a positive potential and a negative potential through a common reactor, and when a voltage imbalance occurs, the charge of one DC capacitor is transferred to the other by turning on-off the switching devices, to thereby suppress the variation in the neutral point potential (Refer to Patent Document 1, for example.).

PRIOR ART DOCUMENT

Patent Document

Patent Document 1: Japanese Patent Application Publication No. Hei 9-65658 (Pages 9-10, FIG. 1)

SUMMARY OF THE INVENTION

Problems to be Solved by the Invention

By the method shown in Patent Document 1, it becomes possible to suppress the fluctuation in the neutral point voltage by a control circuit other than the control of the converter or inverter, but it is required to add a new circuit such as a reactor, switching devices. When a converter is of three levels, since it is possible to suppress the variation in the neutral point voltage by controlling the converter, usually the circuit addition as shown in Patent Document 1 is not carried out.

Incidentally there is an application in which a three-level power conversion apparatus is used usually for driving a motor, and when the operation of the motor is not performed, it is operated as a reactive power regulator. In the case of the application like this, it becomes difficult to suppress the variation in the neutral point voltage by only performing the above-described control of the converter. As this reason, this is considered to be caused by that when the three-level power conversion apparatus is operated as the reactive power regulator, and the fluctuation in the neutral point voltage is detected and a current is supplied from the converter to perform the fluctuation suppressing control, a delay occurs in this neutral point fluctuation suppressing control.

The present invention has been made in view of the above-described problem, and makes it an object to provide a three-level power conversion apparatus which can suppress fluctuation in a neutral point voltage even when operated as a reactive power regulator.

Means for Solving the Problem

In order to achieve the above-described object, a three-level power conversion apparatus of the present invention is provided with first and second three-level converters connected in parallel to an AC power supply system, each of which outputs a three levels direct current, positive side and negative side DC capacitors connected to the DC link of the three levels, at least one three-level inverter to convert the DC outputs of the three levels to an alternating current, to drive an AC motor, and converter control means for controlling the first and second three-level converters, wherein the converter control means has first and second reactive current control means for controlling so that reactive portions of input currents of the first and second three-level converters become a prescribed reactive current reference, respectively first and second neutral point voltage fluctuation suppressing means for controlling first and second PWM control means, respectively, so as to make a difference between voltages applied to the positive side and negative side DC capacitors to be zero, and active current control means for supplying prescribed the circulating active current from the first three-level converter to the second three-level converter.

Effects of the Invention

According to this invention, it becomes possible to provide a three-level power conversion apparatus which can suppress fluctuation in a neutral point voltage even when operated as a reactive power regulator.

EMBODIMENTS TO PRACTICE THE INVENTION

Hereinafter, embodiments of the present invention will be described with reference to the drawings.

First Embodiment

Figure 1:
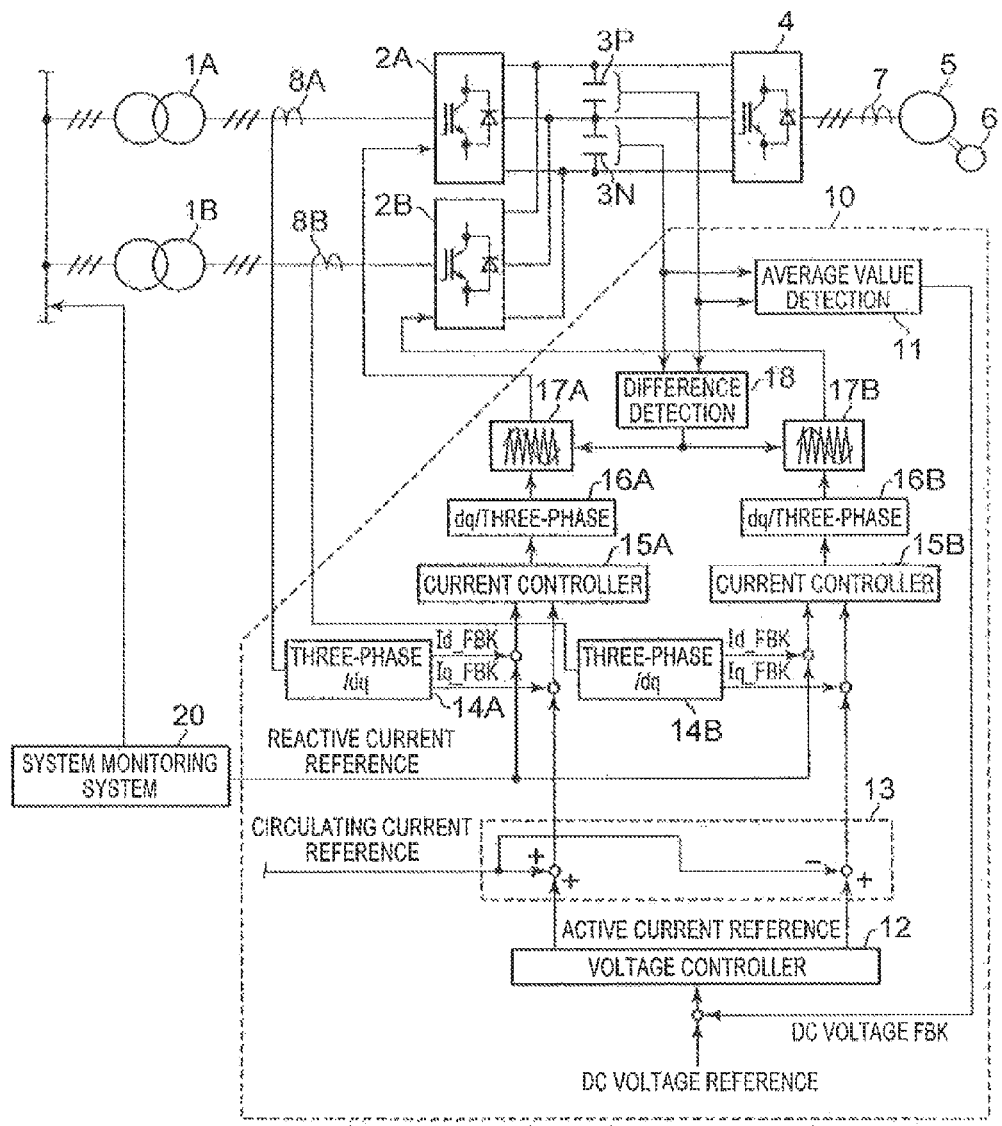
FIG. 1 A circuit configuration diagram of a three-level power conversion apparatus according to a first embodiment of the present invention.

FIG. 1 is a circuit configuration diagram of a three-level power conversion apparatus according to a first embodiment of the present invention. An AC voltage is given from an AC power supply system to three-level converters 2A, 2B through respective transformers 1A, 1B. DC outputs of three levels of the respective three-level converters 2A, 2B are connected in parallel to each other, and a DC capacitor 3P is connected between positive voltage ends and neutral voltage ends, and a DC capacitor 3N is connected between negative voltage ends and the neutral voltage ends, both for smoothing. And the DC outputs of the three levels are given to a three-level inverter 4, and the three-level inverter 4 outputs AC voltages of three levels, to drive an AC motor 5.

A speed detector 6 is fitted on the AC motor 5, and a current detector 7 is fitted on the AC motor 5 at the input side, and these output signals are given to an inverter control unit not shown. Current detectors 8A, 8B are respectively fitted on input sides of the thee-level converters 2A, 2B, and these output signals are given to a converter control unit 10. Hereinafter, an internal configuration of the converter control unit 10 will be described.

A voltage reference that is a target value of the output voltages of the three-level converters 2A, 2B is compared with a DC voltage feedback, and the comparison result is inputted to a voltage controller 12. In this embodiment, an average value of the respective voltages between the both ends of the DC capacitors 3P, 3N is detected by an average value detector 11, and this is used as the DC voltage feedback. The output of the voltage controller 12 becomes an active current reference, and in this embodiment, the same active current references are respectively outputted to the three-level converters 2A, 2B. Correction is performed for each of the active current references by a circulating current correction circuit 13. In the circulating current correction circuit 13, a circulating current reference portion which has been set separately is added to one of the active current references, and the circulating current reference portion is subtracted from the other one of the active current references.

Each of the three-phase currents detected by the current detectors 8A, 8B is converted into an active current feedback Iq_FBK and a reactive current feedback Id_FBK by each of the three-phase/dq converters 14A, 14B.

And, a current controller 15A regulates so that the active current feedback Iq_FBK obtained from the three-phase/dq converter 13A becomes the active current reference to which the above-described circulating current reference portion is added, and outputs a q-axis voltage reference. Similarly, a current controller 153 regulates so that the active current feedback Iq_FBK obtained from the three-phase/dq converter 14B becomes the active current reference from which the above-described circulating current reference portion is subtracted, and outputs a q-axis voltage reference.

In addition, current controllers 15A, 15B regulate so that the reactive current feedback Id_FBK obtained from the three-phase/dq converter 14A and the reactive current feedback Id_FBK obtained from the three-phase/dq converter 14B become a reactive current reference which is given from a system monitoring system 20, and outputs d-axis voltage references, respectively. Here, the system monitoring system 20 outputs the reactive power reference so that a reactive power to be supplied to the AC power supply system becomes a desired value, that is a value to make the power factor of the AC power supply system 1, for example.

Each of the q-axis voltage references and the d-axis voltage references which are obtained like this and are the respective outputs of the current controllers 15A, 15B are converted into three-phase voltage reference by each of dq/three-phase converters 16A, 16B. And the three-phase voltage references are given to PWM controllers 17A, 17B, respectively, and the PWM controllers 17A, 17B perform PWM control to obtain PWM gate signals, and perform ON/OFF control of switching devices of the three-level converters 2A, 2B, respectively.

In addition, the difference between the respective voltages between the both ends of the DC capacitors 3P, 3N is detected by a difference detector 18, and this output is given to the PWM controllers 17A, 17B as a neutral point fluctuation suppressing signal. For example, when the voltage of the DC capacitor 3P is higher than the voltage of the DC capacitor 3N by $\Delta E$, the difference detector 18 gives a correction command to regulate the voltage of the neutral point so that $\Delta E$ becomes 0, to the PWM controllers 17A, 17B. Having received this correction command, each of the PWM controllers 17A, 17B actually performs an operation to superimpose a DC amount proportional to $\Delta E$ onto the voltage reference. In addition, this suppression can also be realized by changing the amplitude of the modulation wave, or adjusting zero periods of the PWM outputs. The fluctuation suppressing control of the neutral point p voltage like this can be achieved more effectively, because the circulating current correction circuit 13 supplies an appropriate amount of circulating. current from the three-level converter 2A to the three-level converter 2B through the DC link, and thereby the delay in the dove-described control is decreased.

Second Embodiment

Figure 2:
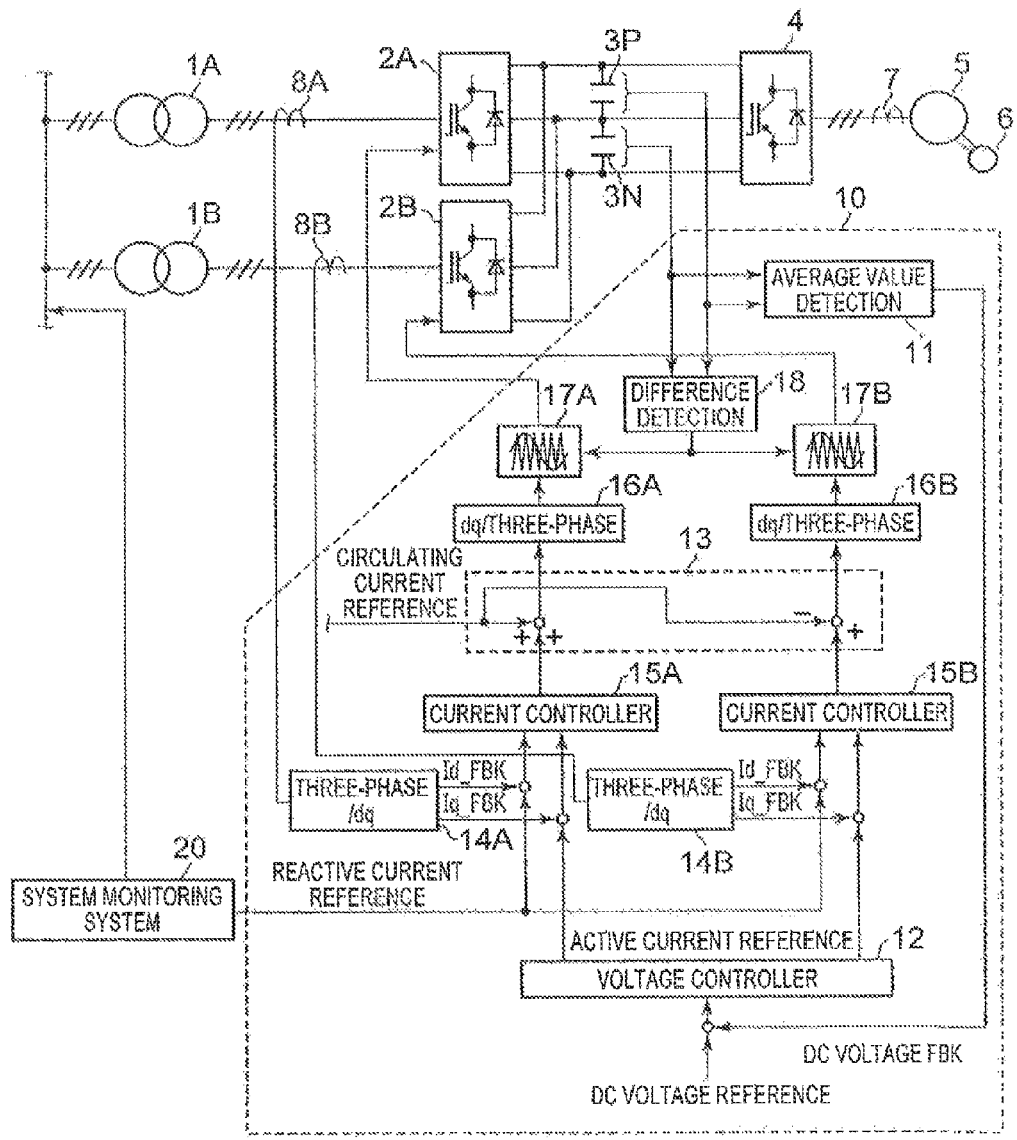
FIG. 2 A circuit configuration diagram of a three-level power conversion apparatus according to a second embodiment of the present invention.

FIG. 2 is a circuit configuration diagram of a three-level power conversion apparatus according to a second embodiment of the present invention. The same portions as the respective portions of the three-level power conversion apparatus according to the first embodiment of the present invention of FIG. 1 are shown by the same symbols, and the description thereof will be omitted. The point that the second embodiment is different from the first embodiment is the point that in a converter control unit 10a, the circulating current correction circuit 13 is moved from the output side of the voltage controller 12 to the output sides of the current controllers 15A, 15B.

As described in the first embodiment, the outputs of each of the current controllers 15A, 15B are the q-axis voltage reference and the d-axis voltage reference. In the second embodiment, the circulating current correction circuit 13 corrects the q-axis voltage references that are the active portions. Accordingly, the meaning of the circulating current reference here is a q-axis voltage correction portion for giving a desired circulating current.

Even when the q-axis voltage reference is corrected for giving the desired circulating current as in this manner, it is apparent that the same effect as the first embodiment is obtained.

Third Embodiment

Figure 3:
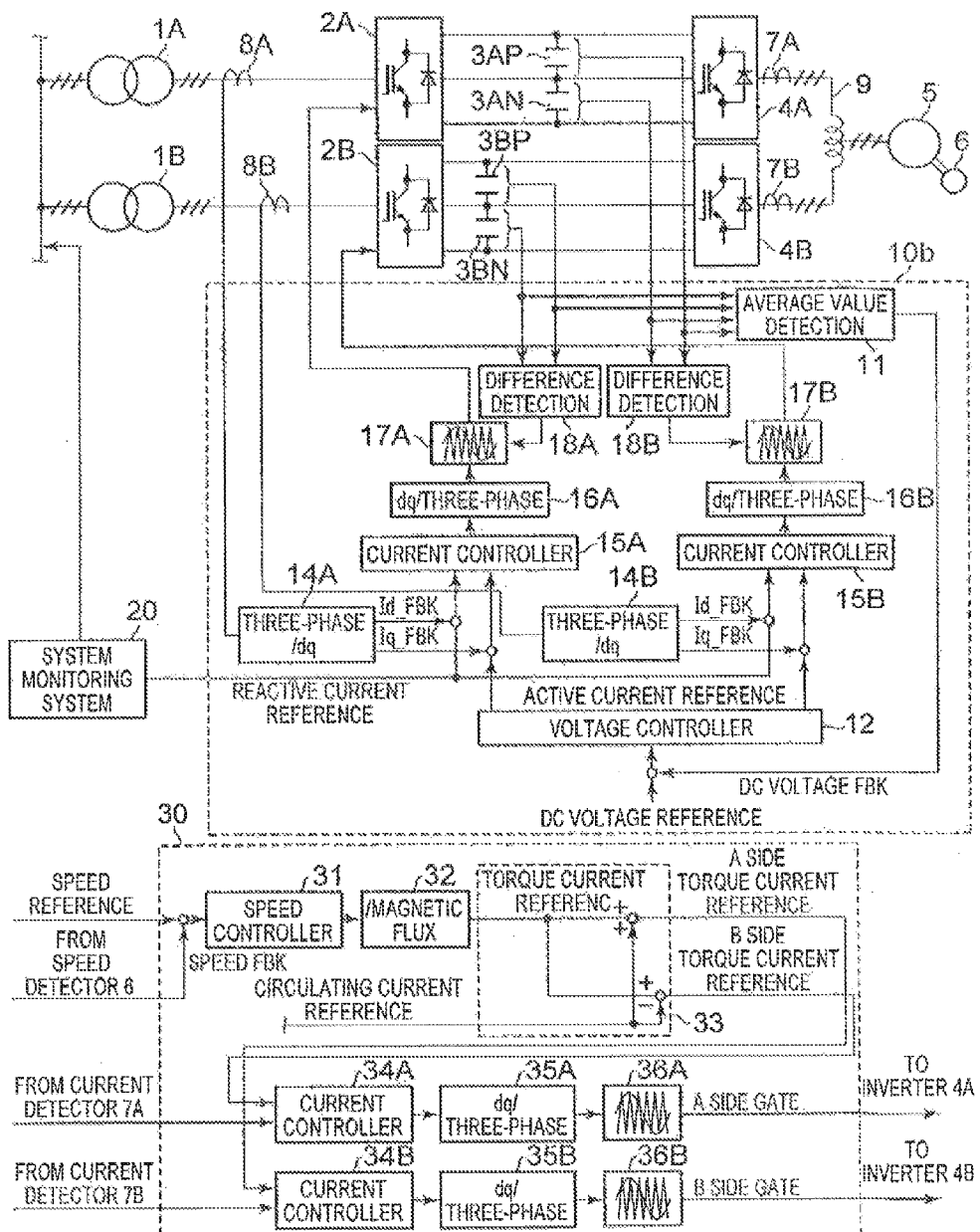
FIG. 3 A circuit configuration diagram of a three-level power conversion apparatus according to a third embodiment of the present invention.

FIG. 3 is a circuit configuration diagram of a three-level power conversion apparatus according to a third embodiment of the present invention. The same portions as the respective portions of the three-level power conversion apparatus according to the first embodiment of the present invention of FIG. 1 are shown by the same symbols, and the description thereof will be omitted. The point that the third embodiment is different from the first embodiment is the point that the three-level inverter is configured to be a parallel configuration of three-level inverters 4A, 4B which drive the AC motor 5 through a coupling reactor 9, the point that a converter controller 10b is configured to be without the circulating current correction circuit 13, and the point that an inverter control unit 30 is explicitly indicated.

The three-level inverter 4A is supplied with DC voltages of the three levels from the three-level converter 2A through DC capacitors 3AP, 3AN, and the three-level inverter 4B is supplied with DC voltage of the three levels from the three-level converter 2B through DC capacitors 3BP, 3BN. Output currents of the three-level inverters 4A, 4B are respectively detected by current detectors 7A, 7B, and these detection signals are given to the inverter control unit 30. Hereinafter, an internal configuration of the inverter control unit 30 will be described.

A speed feedback signal detected by the speed detector 6 is compared with a speed reference given from outside, and a speed controller 31 outputs a torque reference so that the difference becomes small. The torque reference is divided by a magnetic flux in a calculator 32, to become a torque current reference. The torque current reference is separated into an A side torque current reference which is obtained by adding a given circulating current reference to it, and a B side torque current reference which is obtained by subtracting the circulating current reference from it. These are performed in the circulating current correction circuit 33. The A side torque current reference is compared with an A side q-axis current feedback which is obtained by converting a current detected by the current detector 7A by a three-phase/dq converter not shown, and the current controller 34A outputs an A side torque voltage reference so that the difference becomes small. Similarly, the B side torque current reference is compared with a B side q-axis current feedback which is obtained by converting a current detected by the current detector 7B by a three-phase/dq converter not shown, and the current controller 34B outputs a B side torque voltage reference so that the difference become small.

The outputs of the current controllers 34A, 34B are respectively converted into voltage references of the three phases by dq/three-phase converters 35A, 35B, and then the voltage references of the three phases are given to PWM controllers 36A, 36B, respectively. And the PWM controllers 36A, 36B perform PWM control to obtain PWM gate signals, and perform ON/OFF control of switching devices of the three-level inverters 4A, 4B, respectively. In addition, though a current reference of an excitation axis and the conversion thereof are not referred to, since in the present embodiment, the driving of the AC motor 5 is not carried out, the current reference of the excitation axis is zero, and accordingly, it may be thought that an excitation voltage reference which is given to the dq/three-phase converters 35A, 35B is zero.

With the above-described configuration, since the three-level inverter 4A supplies an active current of the circulating current reference portion, and the three-level inverter 4B regenerates the active current of the circulating current reference portion, by the effect of the circulating current correction circuit 33, the active current corresponding to the circulating current is supplied from the three-level converter and is regenerated from the three-level converter 2B. As a result, the three-level converter 2A is in the power running operation, and the three-level converter 2B is in the regenerative operation, and thereby the respective neutral point controls by the difference detectors 17A, 17B can be performed effectively.

Fourth Embodiment

Figure 4:
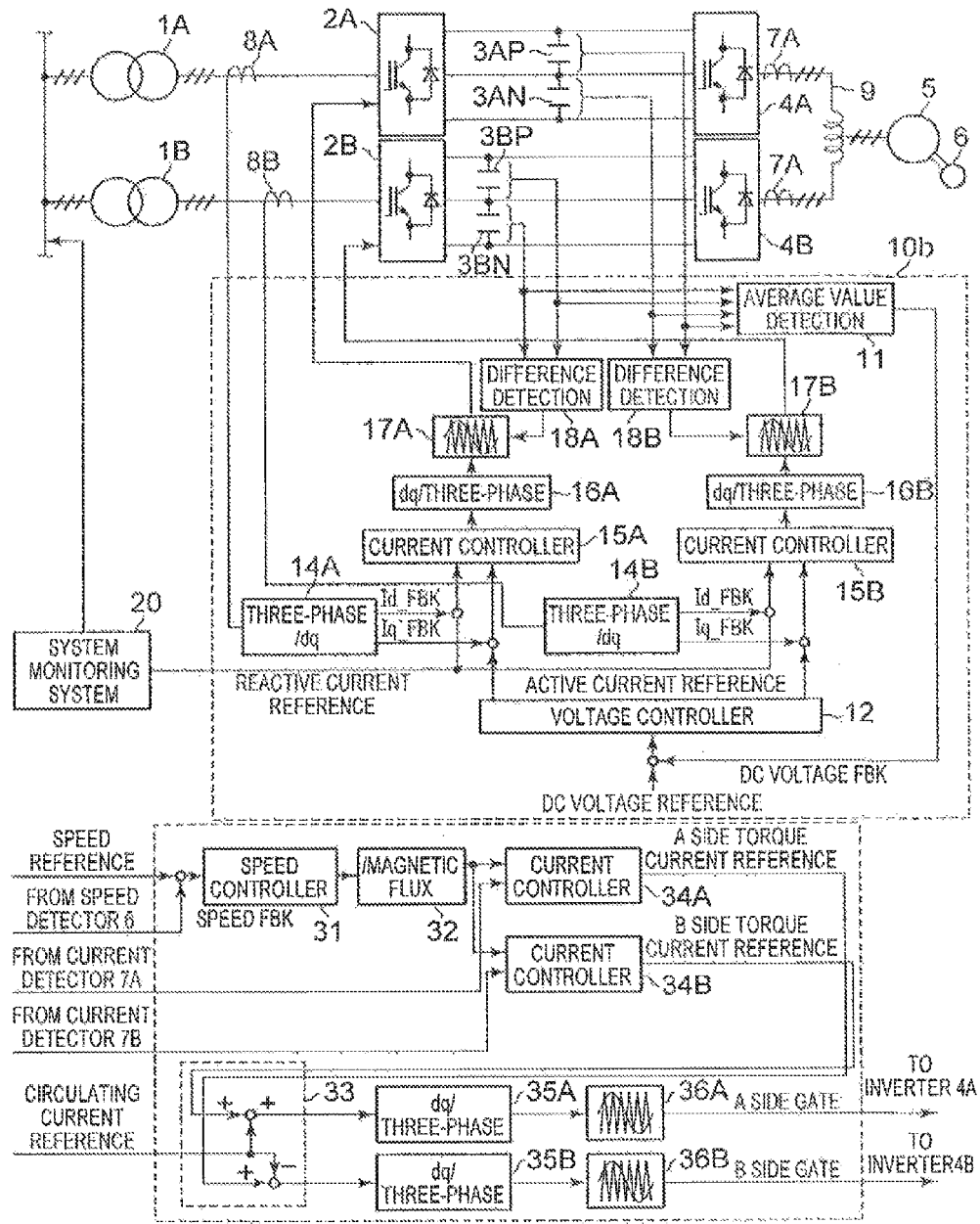
FIG. 4 A circuit configuration diagram of a three-level power conversion apparatus according to a fourth embodiment of the present invention.

FIG. 4 is a circuit configuration diagram of a three-level power conversion apparatus according to a fourth embodiment of the present invention. The same portions as the respective portions of the three-level power conversion apparatus according to the third embodiment of the present invention of FIG. 3 are shown by the same symbols, and the description thereof will be omitted. The point that the fourth embodiment is different from the third embodiment is the point that in an inverter control unit 30a, the circulating current correction circuit 33 is moved from the input sides of the current controllers 34A, 34B to the outputs sides thereof.

As described in the third embodiment, the respective outputs of the current controllers 34A, 34B are the A side torque voltage reference and the B side torque voltage reference. In the fourth embodiment, the circulating current correction circuit 33 corrects these voltage references that are the active portions. Accordingly, the meaning of the circulating current reference here is a torque axis voltage correction portion for giving a desired circulating current.

Even when the torque axis voltage reference is corrected for giving the desired circulating current as in this manner, it is apparent that the same effect as the third embodiment is obtained.

While certain embodiments of the present invention have been described, these embodiments have been presented by way of example only, and are not intended to limit the scope of the inventions. Indeed, the novel embodiments described herein may be bodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the all embodiments, the circulating current reference may be configured to be linked with the reactive current reference given from the system monitoring system. In this case, the circulating current reference may be proportional to the reactive current reference, and may be increased in a stepwise manner in accordance with the increase of the reactive current reference.

In addition, in the first and second embodiments, the voltage controller 12 has been provided in common for the three-level converters 2A, 2B, but may be configured to be provided individually for them.

DESCRIPTION OF THE SYMBOLS 1A, 1B input transformer
2A, 2B three-level converter
3P, 3N, 3AP, 3AN, 3BP, 3BN DC capacitor
4, 4A, 4B three-level inverter
5 AC motor
6 speed detector
7, 7A, 7B current detector
8A, 8B current detector
9 coupling reactor
10, 10a, 10b converter control unit
11 average value detector
12 voltage controller
13 circulating current correction circuit
14A, 14B three-phase/dq converter
15A, 15B current controller
16A, 16B dq/three-phase converter
17A, 17B PWM controller
18, 18A, 18B difference detection circuit
20 system monitoring system
30, 30a inverter control unit
31 speed controller
32 calculator 33 circulating current correction circuit
34A, 34B current controller
35A, 35B dq/three-phase converter
36A, 36B PWM controller

The invention claimed is:

1. A three-level power conversion apparatus, comprising:
first and second three-level converters connected in parallel to an AC power supply system, each of which outputs a three levels direct current;
positive side and negative side DC capacitors connected to the DC link of the three levels;
at least one three-level inverter to convert the DC output of the three levels to an alternating current, to drive an AC motor; and
converter control means for controlling the first and second three-level converters;
wherein the converter control means has:
first and second reactive current control means for controlling so that reactive portions of input currents of the first and second three-level converters become a prescribed reactive current reference, respectively;
first and second neutral point voltage fluctuation suppressing means for controlling first and second PWM control means, respectively, so as to make a difference between voltages applied to the positive side and negative side DC capacitors to be zero; and
active current control means for supplying a prescribed circulating active current from the first three-level converter to the second three-level converter.

2. The three-level power conversion apparatus according to claim 1, wherein:
the DC outputs of the three levels of the first and second three-level converters are connected in parallel, respectively;
the number of the three-level inverters is one; and
the circulating active current is supplied through the DC link.

3. The three-level power conversion apparatus according to claim 2, wherein the converter control means has:
voltage control means for performing feedback control so that the voltage of the DC link becomes a prescribed voltage reference, to output first and second common active current references;
circulating current correcting means for adding a circulating current reference to the active current reference to make a first corrected active current reference, and for subtracting the circulating current reference from the active current reference to make a second corrected active current reference;
first active current control means for performing feedback control so that an active portion of the input current of the first three-level converter becomes the first corrected active current reference, to output a first active voltage reference;
second active current control means for performing feedback control so that the active portion of the input current of the second three-level converter becomes the second corrected active current reference, to output a second active voltage reference;
the first reactive current control means for performing feedback control so that the reactive portion of the input current of the first three-level converter becomes the prescribed reactive current reference, to output a first reactive voltage reference;
the second reactive current control means for performing feedback control so that the reactive portion of the input current of the second three-level converter becomes the prescribed reactive current reference, to output a second reactive voltage reference;
first PWM control means for performing PWM control of a three-phase voltage reference which is obtained by performing three-phase conversion of the first active voltage reference and the first reactive voltage reference, to generate a gate signal of the first three-level converter;
second PWM control means for performing PWM control of a three-phase voltage reference which is obtained by performing three-phase conversion of the second active voltage reference and the second reactive voltage reference, to generate a gate signal of the second three-level converter; and
the neutral point voltage fluctuation suppressing means for controlling the first and second PWM control means, so as to make the difference between voltages applied to the positive side and negative side DC capacitors to be zero.

4. The three-level power conversion apparatus according to claim 2, wherein the converter control means has:
voltage control means for performing feedback control so that the voltage of the DC link becomes a prescribed voltage reference, to output first and second common active current references;
first active current control means for performing feedback control so that an active portion of the input current of the first three-level converter becomes the active current reference, to output a first active voltage reference;
second active current control means for performing feedback control so that the active portion of the input current of the second three-level converter becomes the active current reference, to output a second active voltage reference;
circulating current correcting means for adding a voltage reference corresponding to a circulating current reference to the first active voltage reference, to make a first corrected active voltage reference, and for subtracting the voltage reference corresponding to the circulating current reference from the second active voltage reference, to make a second corrected active voltage reference;
the first reactive current control means for performing feedback control so that the reactive portion of the input current of the first three-level converter becomes the prescribed reactive current reference, to output a first reactive voltage reference;
the second reactive current control means for performing feedback control so that the reactive portion of the input current of the second three-level converter becomes the prescribed reactive current reference, to output a second reactive voltage reference;
first PWM control means for performing PWM control of a three-phase voltage reference which is obtained by performing three-phase conversion of the first corrected active voltage reference and the first reactive voltage reference, to generate a gate signal of the first three-level converter;
second PWM control means for performing PWM control of a three-phase voltage reference which is obtained by performing three-phase conversion of the second corrected active voltage reference and the second reactive voltage reference, to generate a gate signal of the second three-level converter; and
the neutral point voltage fluctuation suppressing means for controlling the first and second PWM control means, so as to make the difference between voltages applied to the positive side and negative side DC capacitors to be zero.

5. The three-level power conversion apparatus according to claim 1, further comprising an inverter control means, wherein:
the positive side and negative side DC capacitors are composed of two sets of the DC capacitors respectively connected to the outputs of the first and second three-level converters;
the three-level inverters are composed of two three-level inverters, that are first and second three-level inverters, for inputting the respective outputs of the first and second three-level converters;
the AC motor is driven by the first and second three-level inverters through a coupling reactor; and
the inverter control means for controlling the two three-level inverters has torque current control means for supplying a prescribed circulating torque current from the first three-level inverter to the second three-level inverter through the coupling reactor.

6. The three-level power conversion apparatus according to claim 5, wherein the inverter control means has:
speed control means for performing feedback control so that a speed of the AC motor becomes a prescribed speed reference, to output a torque current reference;
circulating current correcting means for adding a circulating current reference to the torque current reference, to make a first corrected torque current reference, and for subtracting the circulating current reference from the torque current reference, to make a second corrected torque current reference;
first torque current control means for performing feedback control so that an output torque current of the first three-level inverter becomes the first corrected torque current reference, to output a first torque voltage reference;
second torque current control means for performing feedback control so that an output torque current of the second three-level inverter becomes the second corrected torque current reference, to output a second torque voltage reference;
first excitation current control means for performing feedback control so that an output excitation current of the first three-level inverter becomes a prescribed value, to output a first excitation voltage reference;
second excitation current control means for performing feedback control so that an output excitation current of the second three-level inverter becomes a prescribed value, to output a second excitation voltage reference;
first PWM control means for performing PWM control of a three-phase voltage reference which is obtained by performing three-phase conversion of the first torque voltage reference and the first excitation voltage reference, to generate a gate signal of the first three-level converter; and
second PWM control means for performing PWM control of a three-phase voltage reference which is obtained by performing three-phase conversion of the second torque voltage reference and the second excitation voltage reference, to generate a gate signal of the second three-level converter.

7. The three-level power conversion apparatus according to claim 5, wherein the inverter control means has:
speed control means for performing feedback control so that a speed of the AC motor becomes a prescribed speed reference, to output first and second common torque current references;
first torque current control means for performing feedback control so that an output torque current of the first three-level inverter becomes the first torque current reference, to output a first torque voltage reference;
second torque current control means for performing feedback control so that an output torque current of the second three-level inverter becomes the second torque current reference, to output a second torque voltage reference;
circulating current correcting means for adding a voltage reference corresponding to a circulating current reference to the first torque current reference, to make a first corrected torque voltage reference, and for subtracting the voltage reference corresponding to the circulating current reference from the second torque current reference, to make a second corrected torque voltage reference;
first excitation current control means for performing feedback control so that an output excitation current of the first three-level inverter becomes a prescribed value, to output a first excitation voltage reference;
second excitation current control means for performing feedback control so that an output excitation current of the second three-level inverter becomes a prescribed value, to output a second excitation voltage reference;
first PWM control means for performing PWM control of a three-phase voltage reference which is obtained by performing three-phase conversion of the first corrected torque voltage reference and the first excitation voltage reference, to generate a gate signal of the first three-level converter; and
second PWM control means for performing PWM control of a three-phase voltage reference which is obtained by performing three-phase conversion of the second corrected torque voltage reference and the second excitation voltage reference, to generate a gate signal of the second three-level converter.

8. The three-level power conversion apparatus according to any one of claim 1 to claim 7, wherein:
the circulating current reference is made to be increased when the reactive current reference is increased.

9. The three-level power conversion apparatus according to any one of claim 1 to claim 7, wherein:
the circulating current reference is provided for controlling so that a reactive power given to the AC power supply system becomes a prescribed value, in a state in which the AC motor is not operated.

* * * * *